(12) United States Patent  (10) Patent No.: US 8,587,748 B2
Sun et al. (45) Date of Patent: Nov. 19, 2013

(54) BACKLIGHT MODULE AND LIQUID CRYSTAL DISPLAY DEVICE

(75) Inventors: Ping Sun, Beijing (CN); Laiyou Cui, Beijing (CN); Fang Kang, Beijing (CN)

(73) Assignee: Beijing Boe Optoelectronics Technology Co., Ltd., Beijing (CN)

(*) Notice: Subject to any disclaimer, the term of this patent is extended or adjusted under 35 U.S.C. 154(b) by 142 days.

(21) Appl. No.: 13/286,589

(22) Filed: Nov. 1, 2011

(65) Prior Publication Data

US 2012/0105770 A1 May 3, 2012

(30) Foreign Application Priority Data

Nov. 1, 2010 (CN) .............................. 201020594986

(51) Int. Cl.
 *G02F 1/1335* (2006.01)
(52) U.S. Cl.
 USPC ............... 349/64; 349/58; 349/60; 362/97.2; 362/97.1

(58) Field of Classification Search
 USPC ................................. 349/64, 58, 60
 See application file for complete search history.

(56) References Cited

U.S. PATENT DOCUMENTS

| 3,888,029 A * | 6/1975 | Schubert ......................... 40/603 |
| 7,382,423 B2 * | 6/2008 | Chang et al. .................... 349/64 |
| 2004/0227867 A1 * | 11/2004 | Tanaka et al. ................... 349/58 |
| 2007/0211205 A1 * | 9/2007 | Shibata .......................... 349/161 |
| 2009/0324141 A1 * | 12/2009 | Dais et al. ....................... 383/59 |
| 2010/0045888 A1 * | 2/2010 | Naritomi ........................ 349/58 |

* cited by examiner

*Primary Examiner* — Edward Glick
*Assistant Examiner* — Sang V Nguyen
(74) *Attorney, Agent, or Firm* — Ladas & Parry LLP

(57) ABSTRACT

A backlight module is provided and the backlight module comprises a back plate, a frame, a light source, and a diffusion plate, wherein the diffusion plate is connected with and fixed to the frame or the back plate by hold structures that impose a tension effect on the diffusion plate. Also, a liquid crystal display device comprising the backlight module is provided.

9 Claims, 3 Drawing Sheets

BACKLIGHT MODULE AND LIQUID CRYSTAL DISPLAY DEVICE

BACKGROUND

Embodiments of the disclosed technology relate to a backlight module and a liquid crystal display (LCD) device.

In recently, liquid crystal displays (LCDs) are typical kind of flat panel displays, and thin film transistor liquid crystal displays (TFT-LCDs) are the mainstream type of LCDs. Backlight modules are important components for supplying light in liquid crystal displays when liquid crystal displays are operated, and generally can be classified into a direct type backlight module and a side light type backlight module. Compared with the side light type backlight module, the direct type backlight module is more suitable to be used in the liquid crystal display that requires high brightness and is of a large size, for example, liquid crystal television, etc.

FIG. 1 is a schematic structure view of a conventional direct type backlight module. As shown in FIG. 1, the conventional direct type backlight module includes a back plate 10, a frame 20, a light source 30 and a diffusion plate 40, wherein light sources 30 are disposed on the back plate 10 for supplying light; the frame 20 is disposed around the back plate 10 to hold the diffusion plate 40 between the edge portion of the back plate 10 and the frame 20 and also to accommodate a liquid crystal panel; the diffusion plate 40 is used for diffusing the light emitted from the light source 30, so that the light emitted from the light source 30 can be uniformly irradiated on the liquid crystal panel located on the frame 20, and thus the uniform light can be provided to the liquid crystal panel for display. Meanwhile, in order to protect the diffusion plate 40 from the heat generated by the light sources 30, a certain gap is maintained between the diffusion plate 40 and the light sources 30. For guaranteeing the horizontal optical property of the diffusion plate 40 and preventing the central portions of the diffusion plate 40 from sinking, a plurality of struts 50 are disposed with an interval in the central portion of the back plate 10 in the direct type backlight module to support the diffusion plate 40. Thus, the diffusion plate 40 can avoid recessed portions at its central region due to gravity, and the horizontal optical property of the diffusion plate 40 can be guaranteed.

However, in the conventional direct type backlight module, the diffusion plate 40 is directly placed between the back plate 10 and the frame 30, and is not fixed in the horizontal direction, so the diffusion plate 40 is not fixed firmly. For example, when a vibration test is preformed on the backlight module or the liquid crystal display with the backlight module or the liquid crystal display is in a vibration state, the diffusion plate 40 and the frame 30 for fixing the diffusion plate may rub each other to generate debris or chipping. The generated debris influences the property of the diffusion plate 40 and the liquid crystal panel, resulting in poor display in the liquid crystal display. Further, since the diffusion plate 40 is supported by the plurality of struts disposed on the back plate, the arrangement of the struts may effect the optical property of the light sources, and when the liquid crystal display is in a vibrating state, the struts may rub the diffusion plate to generate debris or chipping, which also influences the property of the diffusion plate 40 and the liquid crystal display. In a drop test, the liquid crystal panel also may be impacted by the struts and pixels may be damaged, which results in white point phenomenon and poor display in the liquid crystal display.

SUMMARY

An embodiment of the disclosed technology provides a backlight module, comprising: a back plate, a frame, a light source, and a diffusion plate, wherein the diffusion plate is connected with and fixed to the frame or the back plate by hold structures that impose a tension effect on the diffusion plate.

Another embodiment of the disclosed technology provides a liquid crystal display device, comprising: a backlight module, and a liquid crystal panel, wherein the backlight module is the backlight module described above.

In the backlight module and the liquid crystal display device according to the embodiments of the disclosed technology, the diffusion plate is connected with and fixed to the back plate or the frame by the hold structures imposing a tension effect on the diffusion plate, the diffusion plate is fixed and placed in a tension state, thereby the recessed deformation at the central portions of the diffusion plate due to gravity can be effectively avoided. Since the diffusion plate is fixed by hold structures, it cannot move in a horizontal direction of the backlight module and rub the frame, the debris or chipping generated by friction between the diffusion plate and the frame can be avoided, and the struts for supporting the diffusion plate are also not necessary, which prevents the disadvantageous influence on the light source and the damages to the diffusion plate and the liquid crystal panel. The backlight module has a simple structure and is easily implemented. During the operation of the backlight module, it will not generate debris and the diffusion plate cannot be damaged due to friction, so the optical property of the diffusion plate can be effectively guaranteed, the stability and the reliability of the backlight module can be improved, and the display quality of the liquid crystal display can also be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the present invention and wherein.

DETAILED DESCRIPTION

The disclosed technology now will be described clearly and fully hereinafter in connection with the accompanying drawings for the embodiments of the disclosed technology, in order to more clarify the object, solution and advantageous of the embodiments of the disclosed technology. Apparently, only some embodiments, but not all embodiments, of the disclosed technology are set forth here. All of other embodiments made by those skilled in the art based on embodiments disclosed herein without mental work fall within the scope of the disclosed technology.

In the conventional direct type backlight module as described above, the diffusion plate are supported by the struts disposed on the back plate, and is not fixed in the horizontal direction, so the diffusion plate and the frame may rub each other to generate debris or chipping; further, the struts may rub the diffusion plate and cause damages to pixels of the liquid crystal panel, so the characteristics of the backlight module are also influenced. With respect to the above problems, an embodiment of the disclosed technology provides an installation way for a diffusion plate in a backlight module, in which the diffusion plate is stretched by a hold structure, so that the diffusion plate is better fixed and the recessed deformation at the central region of the diffusion plate due to gravity can be avoided. In particular, a backlight module with this structure includes a back plate, a frame, a light source, and a diffusion plate, wherein the diffusion plate is connected with and fixed to the frame or the back plate by a hold structure imposing a tension effect on the diffusion plate. The embodiments of the disclosed technology will be described hereinafter in detail.

Figure 1:
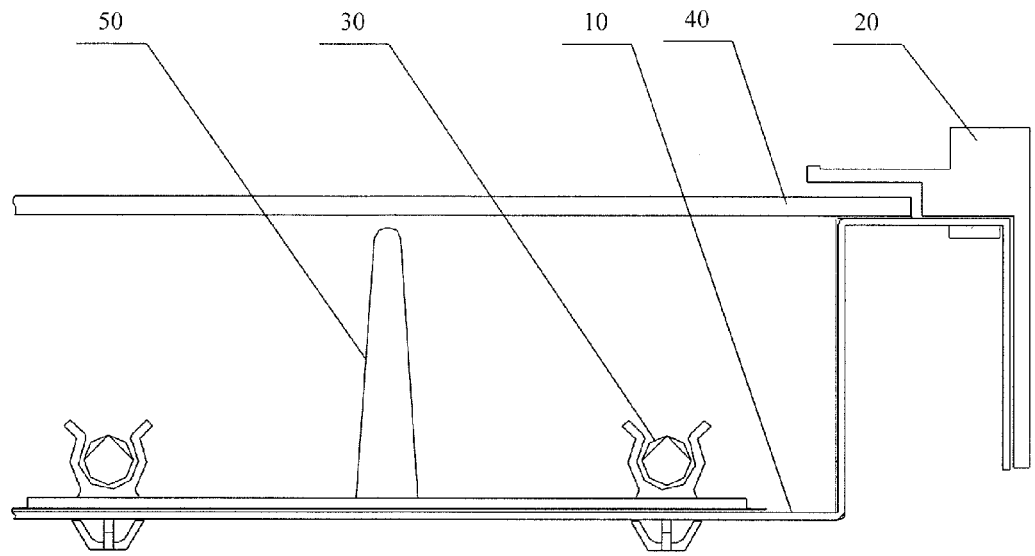
FIG. 1 is a schematic structure view of the conventional direct type backlight module.
Figure 2:
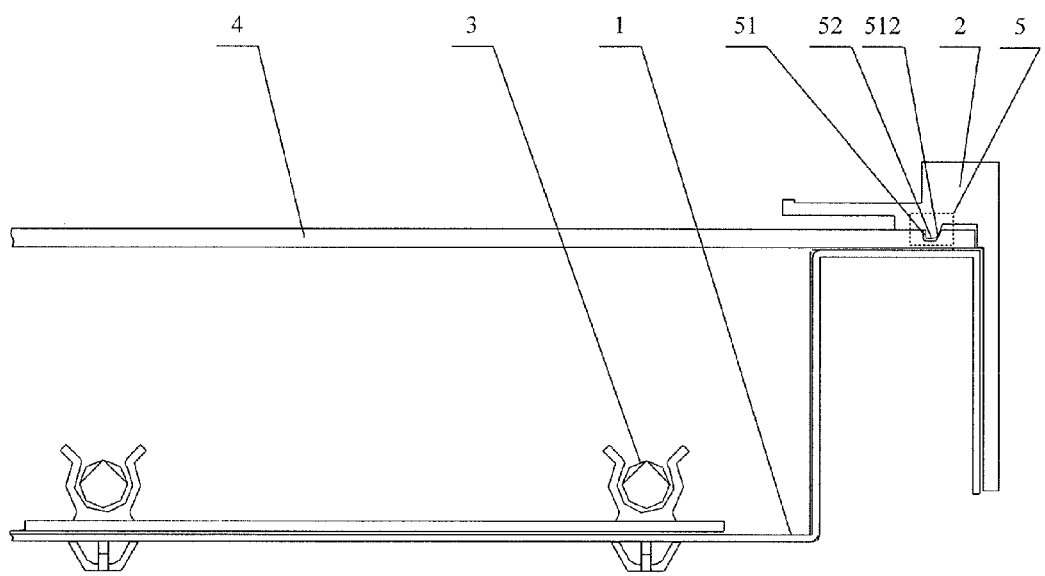
FIG. 2 is a schematic structure view of the backlight module according to a first embodiment of the disclosed technology.

FIG. 2 is a schematic structure view of the backlight module according to a first embodiment of the disclosed technology. As shown in FIG. 2, the backlight module of the embodiment includes a back plate 1, a frame 2, at least one light source 3, and a diffusion plate 4, wherein the light source 3 is fixed on the back plate 1, the frame 2 is disposed along the periphery of the back plate 1, and the diffusion plate 4 is located and fixed between the periphery of the back plate and the frame 2. The diffusion plate 4 is connected with and fixed to the frame 2 by hold structures, each hold structure 5 including a tapered groove 51 and a tapered protrusion 52, and the tapered protrusion 52 engages with the tapered groove 51. The tapered groove 51 is formed on edge portion of the diffusion plate 4, and the tapered protrusion 52 is formed on the frame 2, or vice versa. In this embodiment, when the frame 2 is installed, the tapered protrusion 52 formed on the frame 2 is pressed into the tapered groove 51 formed on the diffusion plate 4, so that the tapered protrusion 52 and the tapered groove 51 can be engaged together firmly. Meanwhile, after the tapered protrusion 52 is pressed into the tapered groove 51, the tapered protrusion 52 can apply an outward stretching force on the diffusion plate 4, so that the diffusion plate 4 is in a tension state, thereby a recessed deformation at the central portions of the diffusion plate 4 due to gravity can be effectively avoided. After the tapered protrusion 52 is engaged with the tapered groove 51, the diffusion plate 4 may be firmly fixed between the back plate 1 and the frame 2, the fastness and the stability of fixing the diffusion plate 4 can be effectively improved, and the friction between the diffusion plate 4 and the frame 2 can be avoided. The positions of the tapered grooves 51 on the diffusion plate 4 can be determined or adjusted based on the degree of the tension occurred in the diffusion plate 4, for example.

In this embodiment, in order to apply a large stretching force on the diffusion plate 4 when the tapered protrusion 52 is engaged with the tapered groove 51 in each hold structure, the tapered face 512 of the tapered groove 51 is disposed near the edge portion of the diffusion plate 4. Also, if necessary, the tapered face 512 is formed with a proper inclined angle, such that when the tapered protrusion 52 is inserted into the tapered groove 51, the tapered face 512 can bear the pressure from the tapered protrusion 52, thereby a large stretching force is applied onto the diffusion plate 4, and the tension degree of the diffusion plate 4 is improved.

In this embodiment, an incline direction of the tapered face 512 may be formed as desired, but the disclosed technology is not limited to this, as long as a proper stretching force is applied to the diffusion plate 4 when the tapered protrusion 52 is engaged with the tapered groove 51 in each hold structure. As shown in FIG. 2, the tapered groove 51 in this embodiment is formed as a groove in which a width of a top portion is greater than that of a bottom portion in the vertical direction in the drawing, so that the tapered face 512 is inclined outwardly. It can be understood by those skilled in the art that when the width of the top portion of the tapered groove is designed to be smaller than that of the bottom portion such that the tapered groove is inclined inwardly, the same effect can be achieved. In this case, the diffusion plate may be fixed by engaging the tapered protrusion with the tapered groove, and thus a large stretching force can be applied to the diffusion plate.

Figure 3:
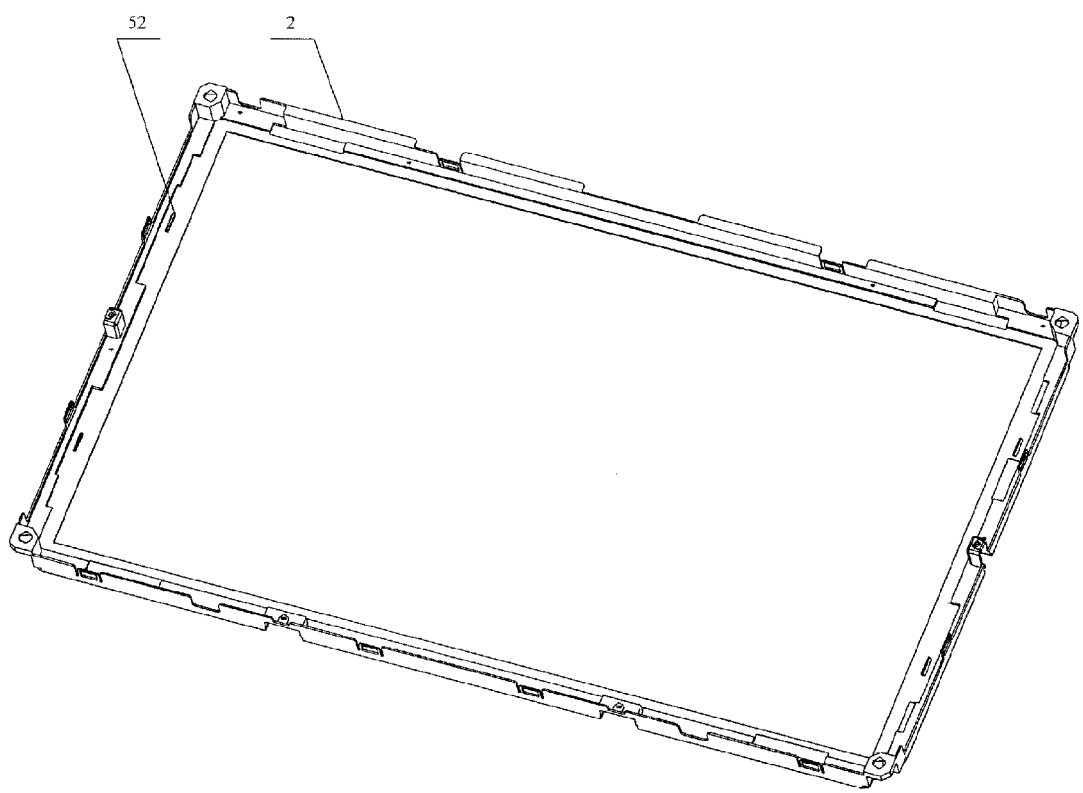
FIG. 3 is a schematic structure view of a frame according an embodiment of the disclosed technology.

FIG. 3 is a schematic structure view of the frame according to the embodiment of the disclosed technology. In this embodiment, the hold structures may be symmetrically disposed on both opposite sides of the backlight module. In order to guarantee the tension effect on the diffusion plate, at least two hold structures are disposed on each side of the backlight module. In particular, as shown in FIG. 3, two tapered protrusions 52 are disposed on each of the left and right sides of the frame 2. When the frame 2 is mounted on the back plate 1, the tapered protrusions 52 may be inserted into the tapered grooves 51 of the diffusion plate 4 which are positioned on the periphery of the back plate 1, so the diffusion plate 4 is fixed in a tension state under the stretching force from the tapered protrusion 52.

In this embodiment, if desired, a proper number of hold structures are disposed along the periphery of the diffusion plate, so that a proper stretching force can be applied to the diffusion plate, and thus a recessed deformation at the central regions of the diffusion plate due to gravity can be effectively avoided during a long time operation of the diffusion plate, and the optical property of the diffusion plate can be guaranteed.

Those skilled in the art can understand that the above hold structure(s) also can be disposed on only one side of the backlight module, and in this example, a fixing device for fixing the diffusion plate is provided on the side opposite to the hold structure(s) of the backlight module. In this way, the fixing device provided on the one side opposite to the hold structure(s) 5 can firmly fix the diffusion plate between the back plate 1 and the frame 2, so that the diffusion plate 4 can be placed in a tension state by providing the hold structure(s) on one side only.

Those skilled in the art can understand that the above tapered protrusion in each hold structure also may be formed in a shape of cylinder, cuboid, etc. Accordingly, the above tapered groove also may be formed in a shape corresponding to the shape of the protrusion and easily engaged with the protrusion. The shape of the protrusion and the groove can be selected as desired, and the disclosed technology is not limited thereto.

In this embodiment, in order to guarantee the stretching force applied to or occurred in the diffusion plate 4, a gap or space may be maintained between the tapered protrusion 52 and the bottom of the tapered groove 51, so that the tapered protrusion 52 may be tightly pressed on the tapered face(s)

512 of the tapered groove 51 and a large stretching force can be applied to the diffusion plate 4.

In assembling the backlight module in this embodiment, firstly, the diffusion plate 4 is placed on the periphery of the back plate 1, then the periphery of the back plate 1 are fitted into the frame 2 and for the hold structures, the tapered protrusions 52 formed thereon align with the tapered grooves 51 on the diffusion plate 4, so that the tapered protrusions 52 are tightly pressed on the tapered face 512 of the tapered groove 51 by a pressing force generated during mounting the frame 2, an outward stretching force may be applied to the diffusion plate 4 by the tapered face 512 of the tapered protrusion 52, thus the diffusion plate 4 is in a tension state, and the recessed deformation at the central regions of the diffusion due to gravity can be effectively avoided. Also, the diffusion plate 4 may be stably and firmly fixed between the back plate 1 and the frame 2 by the latch connection between the tapered protrusions 52 and the tapered grooves 51, the horizontal movement of the diffusion plate 4 can be prevented, and also there is substantially no friction between the diffusion plate 4 and the frame 2.

In the backlight module of the embodiment, the diffusion plate is fixed between the back plate 1 and the frame 2 by the hold structures, so the diffusion plate 4 is in a tension state under the effect of the hold structures, and the recessed deformation at the central portions of the diffusion plate due to gravity can be avoided. Also, since the diffusion plate 4 can be fixed by the hold structure, the diffusion plate cannot move in the horizontal direction of the backlight module, there is no friction between the diffusion plate and the frame, and the debris or chipping generated by the friction between the diffusion plate and the frame can be effectively avoided. There is no need of providing struts for supporting the diffusion plate as that in the conventional technology, so the influence on the light sources and the damages to the diffusion plate and the liquid crystal panel by the struts can be avoided also. The backlight module of the disclosed technology has simple structure and is easily implemented. During the operation of the backlight module, it substantially does not generate debris or chipping and the diffusion plate will not be damaged, so the optical property of the diffusion plate can be effectively guaranteed, the stability and reliability of operating the backlight module can be improved, and the display quality of the liquid crystal display can be also improved.

Figure 4:
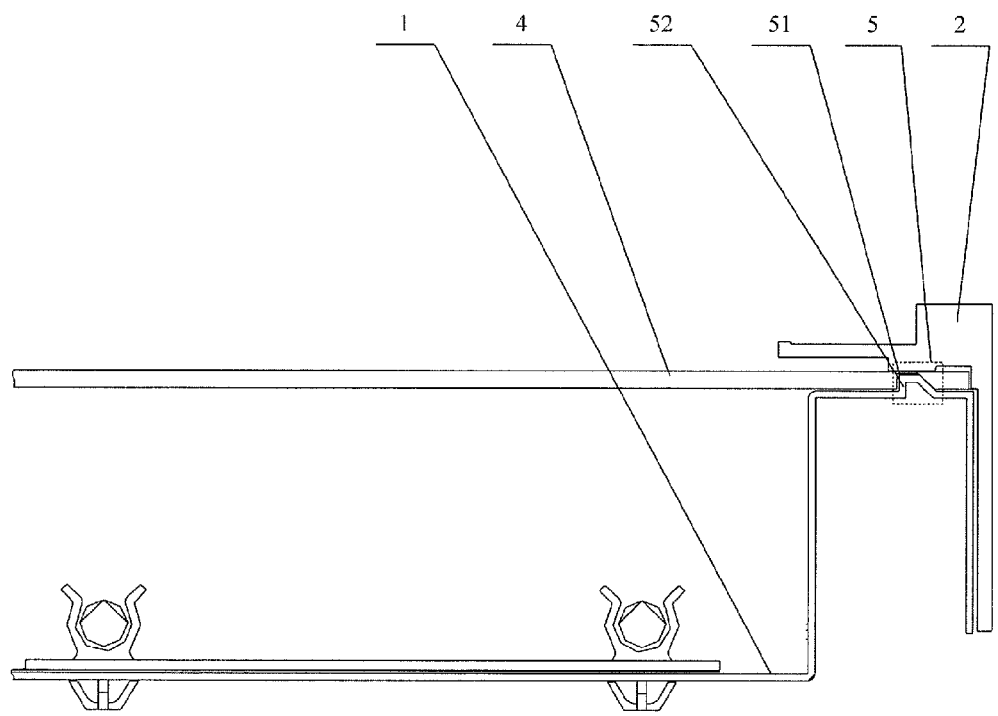
FIG. 4 is a schematic structure view of the backlight module according to a second embodiment of the disclosed technology.

FIG. 4 is a schematic structure view of the backlight module according to a second embodiment of the disclosed technology. The difference between the first embodiment shown in FIG. 2 and this embodiment lies in that the tapered protrusion 52 of one hold structure is disposed on the periphery of the back plate 1; during assembling the backlight module, the tapered protrusion 52 on the back plate 1 is tightly pressed into the tapered groove 51 of the diffusion plate 4, that is, the diffusion plate 4 is firmly fixed between the frame 2 and the periphery of the back plate 1, and the diffusion plate 4 is placed in a tension state by applying a stretching force thereon from the tapered protrusion 52. In FIG. 4, the top surface of each tapered protrusion 52 contacts the bottom surface of the tapered groove 51, or there is a gap or space between them, but this embodiment is not limited to this.

In this embodiment, the tapered protrusions of the hold structures are disposed along the periphery of the back plate 1, so there can be more contacting area between the frame 2 and the diffusion plate 4 while the frame 2 is assembled to the back plate 1. In this way, the stability of the fixed diffusion plate can be effectively guaranteed. When the frame 2 applies the stretching force onto the diffusion plate 4, the tapered groove 51 is tightly pressed on the tapered protrusion 52, so that the tapered protrusion 52 may apply a counter pressure on the tapered face 512 of the tapered groove 51, thereby an outward stretching force is applied to the diffusion plate 4 and can place the diffusion plate 4 in a tension state.

Figure 5:
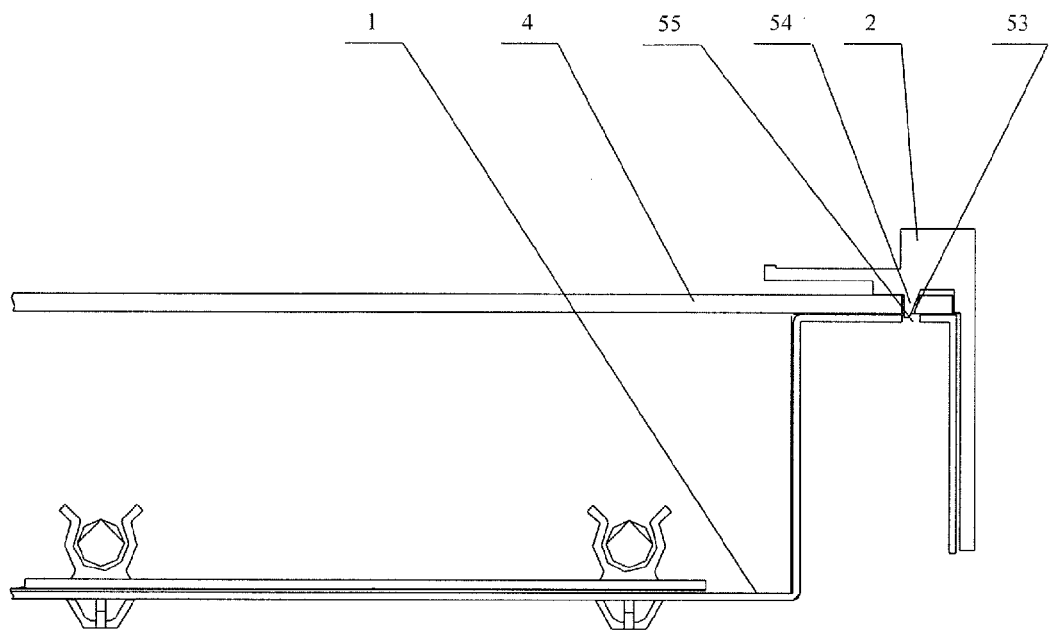
FIG. 5 is a schematic structure view of the backlight module according to a third embodiment of the disclosed technology.

FIG. 5 is a schematic structure view of the backlight module according to a third embodiment of the disclosed technology. The difference between the first embodiment shown in FIG. 2 and this embodiment lies in that each hold structure includes a tapered via hole 53 and a tapered protrusion 54. The tapered via holes 53 of the hold structures are disposed along the edges of the diffusion plate 4, and the tapered protrusions 54 on the frame 2 can pass through the tapered via hole 53. Further, in an example, a via hole 55 may be disposed at the position corresponding to a tapered via hole 53 on the periphery of the back plate 1, so that a portion of the tapered protrusion 54 can be protruded from the tapered via hole 53 and be accommodated within the via hole 55; such configuration can provide a stable and tight connection.

In this embodiment, the diffusion plate is fixed between the back plate and the frame by the latch connection between the tapered protrusion and the tapered via hole, and a large stretching force is applied to the diffusion plate by this latch connection, so the diffusion plate may be in a tension state, the recessed deformation at the central portions of the diffusion plate due to gravity can be avoided, and the optical property of the diffusion plate can be effectively guaranteed.

In addition, those skilled in the art can understand that the tapered protrusions of the embodiment as shown in FIG. 5 can be also disposed along the periphery of the back plate, and via holes or grooves may be formed on the frame and used for accommodating the portion of the tapered protrusion that protruded out of the tapered via hole, which has a structure similar as that shown in FIG. 5, so the detail description is not repeated herein.

Figure 6:
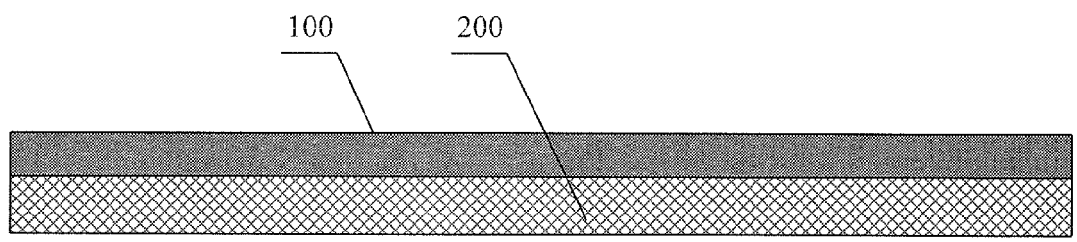
FIG. 6 is a schematic structure view of a liquid crystal display according to an embodiment of the disclosed technology.

FIG. 6 shows a LCD device according to an embodiment of the disclosed technology. As shown in FIG. 6, the LCD device according to the embodiment includes a liquid crystal panel 100 and a backlight module 200 which is provided behind the liquid crystal panel 100. The backlight module 200 can be implemented according to one of the above embodiments. The liquid crystal display device in this embodiment may be that for a monitor, a mobile phone, a laptop computer, a liquid crystal TV set, a digital photo album and etc.

Since the diffusion plate of the backlight module 200 is fixed between the back plate and the frame by hold structures and a stretching force is applied to the diffusion plate by the hold structures, there is substantially no friction between the diffusion plate and the frame or the struts when the liquid crystal display is in the vibration state, for example, in the delivering process, etc. as that in the conventional technology. Thus, debris or chipping generation or damages to the diffusion plate can be avoided, and the characteristics of the backlight module can be effectively guaranteed, thereby the display quality of the liquid crystal display device can be improved.

It should be noted that: the above description is only for the purpose of describing the solution of the disclosed technology but not for a limitation thereto; although the disclosed technology has been described in detail with reference to the preferred embodiments, those skilled in the art should understand that variation and alternation can be made in the solutions of the disclosed technology; such variation and alternation are not to be regarded as a departure from the spirit and scope of the disclosed technology.

What is claimed is:

1. A backlight module, comprising:
   a back plate, a frame, a light source, and a diffusion plate, wherein the diffusion plate is connected with and fixed to the frame or the back plate by hold structures that impose a tension effect on the diffusion plate, wherein each of the hold structures includes a tapered via hole and a tapered protrusion, and the tapered protrusion passes through the tapered via hole.

2. The backlight module of claim 1, wherein the tapered via hole is provided on an edge portion of the diffusion plate, and the tapered protrusions are formed on the frame.

3. The backlight module of claim 2, wherein a via hole or groove for accommodating a portion of the tapered protrusion protruding from the tapered via hole is further provided on a periphery of the back plate.

4. The backlight module of claim 1, wherein the tapered via hole is formed in an edge portion of the diffusion plate, and the tapered protrusion is formed on a periphery of the back plate.

5. The backlight module of claim 4, wherein a via hole or groove for accommodating a portion of the tapered protrusion protruding from the tapered via hole is further provided on the frame.

6. The backlight module of claim 1, wherein the hold structures are located at one side of the backlight module, and a fixing device for fixing the diffusion plate is provided on a side opposite to the side of the hold structures on the backlight module.

7. The backlight module of claim 1, wherein the hold structures are symmetrically disposed on both opposite sides of the backlight module.

8. The backlight module of claim 1, wherein at least two hold structures are disposed on each side of the backlight module.

9. A liquid crystal display device, comprising:

a backlight module, and a liquid crystal panel, wherein the backlight module is the backlight module according to claim 1.

* * * * *